United States Patent
Grondin

(10) Patent No.: US 9,235,496 B2
(45) Date of Patent: Jan. 12, 2016

(54) DOMAIN CENTRIC TEST DATA GENERATION

(71) Applicant: Informatica LLC, Redwood City, CA (US)

(72) Inventor: Richard Grondin, Sainte-Julie (CA)

(73) Assignee: Informatica LLC, Redwood City, CA (US)

( * ) Notice: Subject to any disclaimer, the term of this patent is extended or adjusted under 35 U.S.C. 154(b) by 63 days.

(21) Appl. No.: 14/056,868

(22) Filed: Oct. 17, 2013

(65) Prior Publication Data

US 2015/0113330 A1    Apr. 23, 2015

(51) Int. Cl.
*G06F 11/00* (2006.01)
*G06F 11/36* (2006.01)

(52) U.S. Cl.
CPC ............ *G06F 11/3684* (2013.01); *G06F 11/36* (2013.01)

(58) Field of Classification Search
CPC .................................................. G06F 11/3684
See application file for complete search history.

(56) References Cited

U.S. PATENT DOCUMENTS

| | | | |
|---|---|---|---|
| 6,571,232 B1 * | 5/2003 | Goldberg et al. | |
| 7,606,792 B2 * | 10/2009 | Cunningham et al. | |
| 8,375,351 B2 * | 2/2013 | Ahadian et al. | 717/101 |
| 8,412,720 B2 * | 4/2013 | Britton et al. | 707/755 |
| 8,458,164 B2 * | 6/2013 | Payton et al. | 707/713 |
| 2012/0173587 A1 | 7/2012 | Clifford et al. | |
| 2013/0254171 A1 | 9/2013 | Grondin et al. | |
| 2014/0122445 A1 * | 5/2014 | Hashimoto et al. | 707/690 |

FOREIGN PATENT DOCUMENTS

JP       2001-256076 A  *  9/2001

OTHER PUBLICATIONS

European Extended Search Report, European Application No. 14189279.4, Jun. 23, 2015, 7 pages.
O'Neil, P. et al., "Multi-Table Joins Through Bitmapped Join Indices," SIGMOD Record, Sep. 1995, pp. 8-11, vol. 24, No. 3.

* cited by examiner

*Primary Examiner* — Christopher McCarthy
(74) *Attorney, Agent, or Firm* — Fenwick & West LLP

(57) ABSTRACT

A test data extraction and persistence technique that relies on a data domain based storage infrastructure is disclosed. In operation, a test data server receives a test data query that specifies selection parameters for selecting test data and any transformation operations to be performed on the test data. The test data server identifies domains associated with the selection parameters and traverses the tables in the database based on the identified domains to extract test data that satisfies the selection parameters. The test data server optionally performs transformation operations, such as masking operations, specified by the test data query on the extracted data. The identified domains are stored such that test data that satisfies the test data query may be extracted from the database repetitively without reevaluating the test data query each time.

20 Claims, 11 Drawing Sheets

Customer Table 202

| CustId | Name | City | SSN |
|---|---|---|---|
| 1 | 6 | 4 | 1 |
| 2 | 5 | 2 | 6 |
| 3 | 7 | 1 | 4 |
| 4 | 1 | 4 | 7 |
| 5 | 2 | 3 | 3 |
| 6 | 4 | 1 | 2 |
| 7 | 3 | 3 | 5 |

210

Bill Table 204

| TrxDate | CustId | BillId | Total | CreditCard |
|---|---|---|---|---|
| 1 | 3 | 1 | 7 | 5 |
| 1 | 6 | 2 | 5 | 1 |
| 1 | 5 | 3 | 1 | 4 |
| 2 | 6 | 4 | 4 | 1 |
| 2 | 4 | 5 | 3 | 3 |
| 3 | 1 | 6 | 2 | 0 |
| 3 | 4 | 7 | 6 | 3 |

212   214

Line Item Table 206

| BillId | ProductID | Qte |
|---|---|---|
| 1 | 1 | 4 |
| 1 | 5 | 2 |
| 2 | 3 | 3 |
| 2 | 2 | 2 |
| 3 | 4 | 1 |
| 4 | 3 | 3 |
| 5 | 2 | 2 |
| 5 | 4 | 2 |
| 5 | 5 | 1 |
| 6 | 4 | 2 |
| 7 | 2 | 3 |

216   218

Product Table 208

| ProductId | Price |
|---|---|
| 1 | 4 |
| 2 | 6 |
| 3 | 5 |
| 4 | 3 |
| 5 | 1 |
| 6 | 2 |

Bill

| TrxDate | CustId | BillId | Total | CreditCard |
|---|---|---|---|---|
| 20121212 | 202 | 4052 | 6 | 5001 0001 0020 0300 |
| 20121214 | 187 | 4054 | 56 | 4321 4321 4321 4321 |
| 20121215 | 12 | 4055 | 12 | |
| 20121215 | 187 | 4056 | 84 | 4321 4321 4321 4321 |

Lineitem

| BillId | ProductID | Qte |
|---|---|---|
| 4052 | P103 | 1 |
| 4054 | P101 | 2 |
| 4054 | P103 | 2 |
| 4054 | P104 | 1 |
| 4055 | P103 | 2 |
| 4056 | P101 | 4 |

Product

| ProductId | Price |
|---|---|
| P101 | 21 |
| P103 | 6 |
| P104 | 2 |

Customer

| CustId | Name | City | SSN |
|---|---|---|---|
| 12 | Mr X | Paris | 123 456 890 |
| 87 | Mr W | Montreal | 876 289 771 |
| 187 | Mr A | Paris | 999 123 654 |
| 202 | Mr B | New York | 182 123 456 |
| 321 | Mr F | New York | 487 654 908 |

Figure 5A:
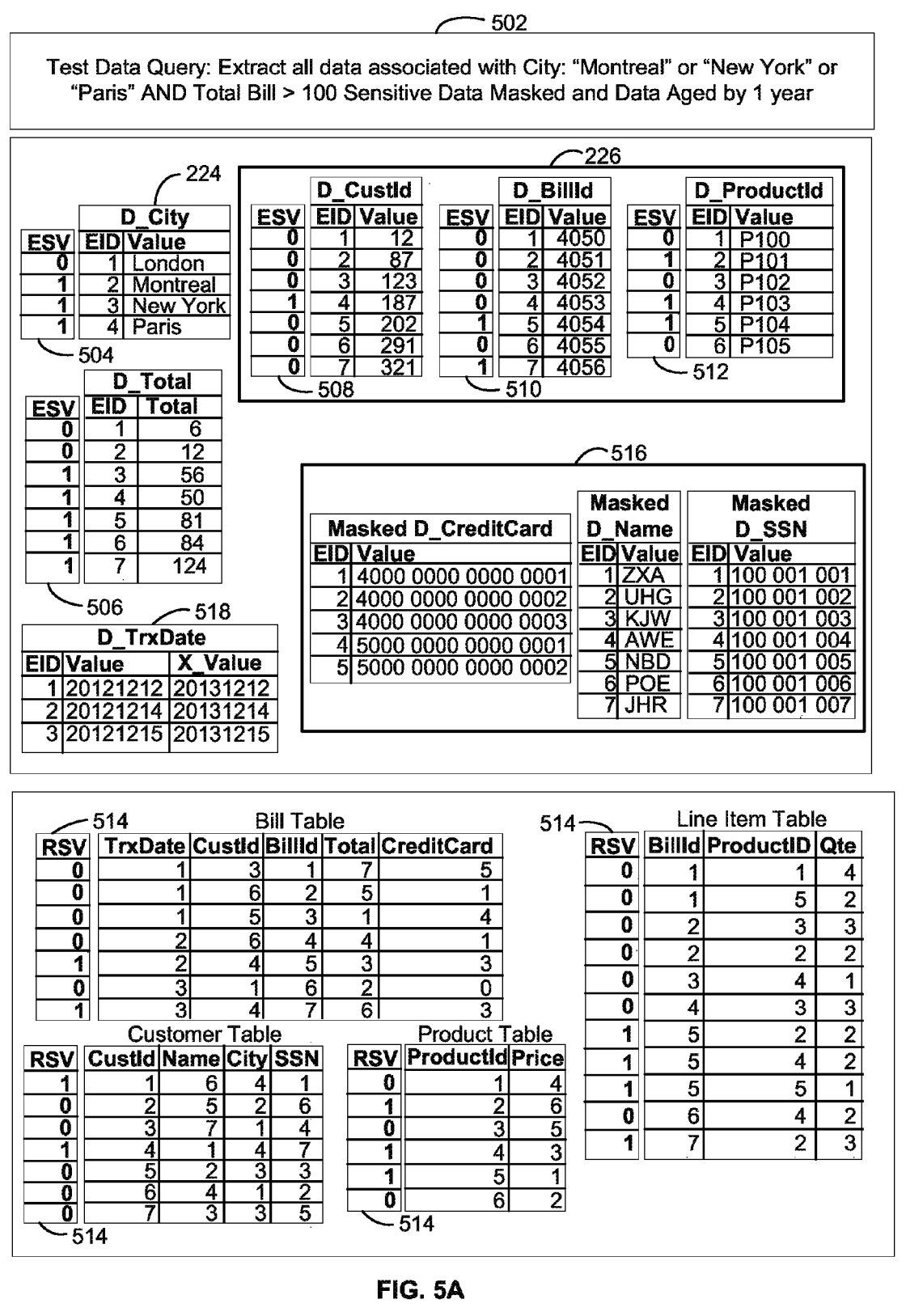

502 — Test Data Query: Extract all data associated with City: "Montreal" or "New York" or "Paris" AND Total Bill > 100 Sensitive Data Masked and Data Aged by 1 year

520

Bill

| TrxDate | CustId | BillId | Total | CreditCard |
|---|---|---|---|---|
| 20131214 | 187 | 4054 | 56 | 5000 0001 0000 0001 |
| 20131215 | 187 | 4056 | 84 | 5000 0001 0000 0001 |

Lineitem

| BillId | ProductID | Qte |
|---|---|---|
| 4054 | P101 | 2 |
| 4054 | P103 | 2 |
| 4054 | P104 | 1 |
| 4056 | P101 | 4 |

Product

| ProductId | Price |
|---|---|
| P101 | 21 |
| P103 | 6 |
| P104 | 2 |

Customer

| CustId | Name | City | SSN |
|---|---|---|---|
| 12 | POE | Paris | 100 001 006 |
| 187 | ZXA | Paris | 100 001 001 |

FIG. 5B

DOMAIN CENTRIC TEST DATA GENERATION

BACKGROUND

1. Field of Disclosure

The disclosure generally relates to testing database applications, and in particular to domain centric test data generation.

2. Background Information

When testing an application that accesses and manipulates data in database, it is beneficial to generate test data that has characteristics of real data to test the various features of the application. In some testing environments, test data is generated manually by creating fake data sets as the need arises. In other testing environments, existing live test data from a database is selected every time test data is needed for testing a particular feature of the application. In both environments, the test data generation process is repetitive and labor intensive. Further, using live data for testing purposes requires that the test development engineer to have access to the data in the database. Database applications often handle sensitive user or enterprise data, and exposing such data to non-essential third parties, such as test development engineers, is highly undesirable.

SUMMARY

A test data server is configured to extract automatically test data from a database. Data in the database is organized into data domains. A data domain corresponds to one or more columns in a table within the database and includes, for each unique value in the designated column(s), a corresponding unique entity identifier; thus a given table can be associated with multiple data domains, each having different designated columns, and thereby different sets of unique values therein. In one aspect, the test data server receives a test data query that specifies a selection parameter and identifies a data domain associated with the selection parameter. The test data server generates an entity selection map that identifies one or more entity identifiers in the data domain that satisfy the selection parameter. Based on the entity selection map, the test data server generates a test data definition associated with the test data query. The test data definition identifies test data in the database associated with the one or more entity identifiers. The test data server executes the test data definition to extract the test data that satisfies the test data query. The test data definition may be persistent so that the definition may be executed again at a different time to generate the test data. Further, test data definitions associated with different test data queries may be combined, and the combined definitions may be executed to generate test data.

In one embodiment, a test data server includes a definition generation module, a test data extraction module, and a test data manipulation module. The definition generation module is configured to receive as input a test data query that specifies, among other information, a set of test data selection parameters, and generate a test data definition that identifies values in the domains associated with the selection parameters that satisfy the selection parameters. The definition generation module stores test data definitions in a test data inventory. The test data extraction module is configured to execute test data definitions stored in the test data inventory and extract test data from the database based on the definitions, and is one means for performing this function. In addition, the test data manipulation module is configured to combine multiple test data definitions stored in the test data inventory by applying combination functions, such as union and intersection, on the definitions. The combined test data definition may be executed by the test data extraction module to extract test data associated with multiple selections parameters from the database.

With the techniques described herein, test data definitions generated once may be executed repetitively to generate test data that satisfies test data queries provided by test development engineers in the past. This eliminates the overhead of repeatedly creating and processing the same test data queries to generate the same types of test data. Further, being able to combine test data definitions generated for different test data queries allows test development engineers to build on previously extracted test data and test different combinations of features of a given application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 2A illustrates exemplary tables in the database according to one embodiment.

FIG. 4B illustrates the test data extracted from the database based on the test data query of FIG. 4A according to one embodiment.

FIG. 5A illustrates an exemplary test data query and the resulting entity selection maps according to one embodiment.

FIG. 5B illustrates the test data 520 extracted from the database 102 based on the test data query of FIG. 5A according to one embodiment.

DETAILED DESCRIPTION

System Architecture

Figure 1:
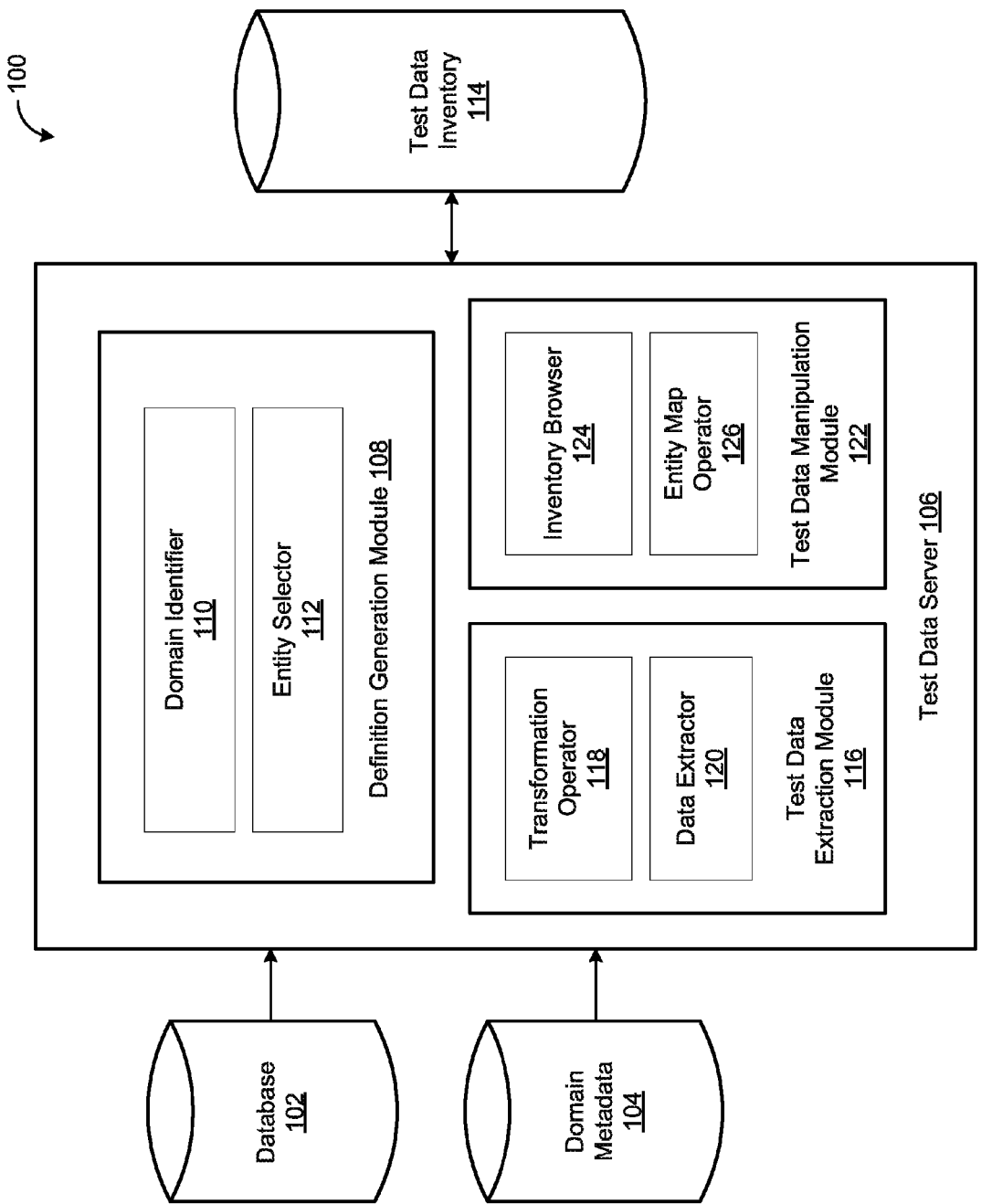
FIG. 1 is a high-level block diagram of a computing system for generating test data according to one embodiment.

FIG. 1 is a high-level block diagram of a computing system 100 for generating test data according to one embodiment. The system 100 includes a database 102, domain metadata 104, a test data server 106, and test data inventory 114. The system 100 can be implemented in a database management system (DBMS) for any type of database model, including relational, hierarchical, attribute-value, object, network, semantic, graph, and so forth. The system 100 may be implemented using a single computer, or a network of computers, including cloud-based computer implementations. The computers are preferably server class computers including one or more high-performance CPUs and 1G or more of main memory, as well as 500 Gb to 2 Tb of computer readable, persistent storage, and running an operating system such as LINUX or variants thereof. The operations of the system 100 as described herein can be controlled through a combination of hardware and computer programs installed in computer storage and executed by the processors of such servers to perform the functions described herein of the test data server 106, database 102, domain metadata 104, and test data inventory 114. The system 100 includes other hardware elements necessary for the operations described here, including network interfaces and protocols, input devices for data entry, and output devices for display, printing, or other presentations of data, but which are not shown here in order to avoid obscuring the relevant details of the embodiments.

The database 102 stores data associated with one or more applications that access and operate on the data. According to one embodiment using a relational database model, the database 102 is organized as a series of tables, each table representing a particular entity type or operation type, and having one or more columns defining fields (equivalently, dimensions or attributes) of the data, and one or more rows storing instances data corresponding to the entity or operation type. For example, data related to the entity type "Customers" may be stored in the "Customer Information" table, and data related to the operation type "Purchases" may be stored in the "Purchase History" table.

Data in the database 102 is stored in a compact domain representation. Each unique column in the series of tables is associated with a different domain that is represented by a domain data structure stored in domain metadata 104. A domain data structure representing a given domain associated with a given column stores all the unique values corresponding to the column. Each unique value in the domain data structure is associated with an entity identifier, and the corresponding column in the database 102 stores in each of its rows the entity identifiers associated with the values for these rows, instead of the actual values.

The domain metadata 104 stores a domain category for each domain. A domain category indicates how data associated with the domain may be processed during data extraction. A particular domain may be categorized as a "sensitive" domain that is associated with sensitive data that may need to be masked during data extraction. In one embodiment, the domain data structure representing a sensitive domain stores a masking function that is executed to mask the sensitive data during data extraction.

Alternatively, a particular domain may be categorized as a "regular" domain that is associated with data that may be transformed during data extraction. Similarly, a particular domain may be categorized as a "transformation" domain that is associated with data that may be used to perform transformations during data extraction. Such data may include time and date data.

In addition, a particular domain may be categorized as a "driving" domain that is used for data subsetting during data extraction, as discussed below. Two or more columns in different tables in the database 102 may be associated with the same driving domain. One of the columns associated with a driving domain is a primary column and the remaining columns are linked to the primary column. Entity identifiers included in the domain data structure representing the driving domain are used in both columns.

As an example, assume that the "Customer Information" table includes a "Zip Code" column and six rows, each row corresponding to a different user. The "Zip Code" column is associated with a "Zip Code" domain represented by a domain data structure. The domain data structure includes all the unique values corresponding to the "Zip Code" column. Each of the unique values included in the "Zip Code" domain data structure is associated with a different entity identifier. Consequently, the "Zip Code" column in each row of the "User Information" table stores the entity identifier associated with the relevant unique value instead of the actual value. Table 1 shows an example of the unique values included in the "Zip Code" domain data structure and Table 2 shows how those values are represented in the "Customer Information" table, using the entity identifiers corresponding to the zip code values, rather than the zip code values themselves.

TABLE 1

Zip Code Domain Data Structure

| Zip Code Entity ID | Zip Code Value |
|---|---|
| 0 | 02139 |
| 1 | 95054 |
| 2 | 94041 |
| 3 | 17310 |

TABLE 2

Use of Entity Identifiers in Customer Information Table

| Customer ID | Zip Code Entity ID |
|---|---|
| 432 | 1 |
| 1277 | 1 |
| 2136 | 2 |
| 3490 | 0 |
| 4879 | 3 |
| 5788 | 1 |

Figure 2B:
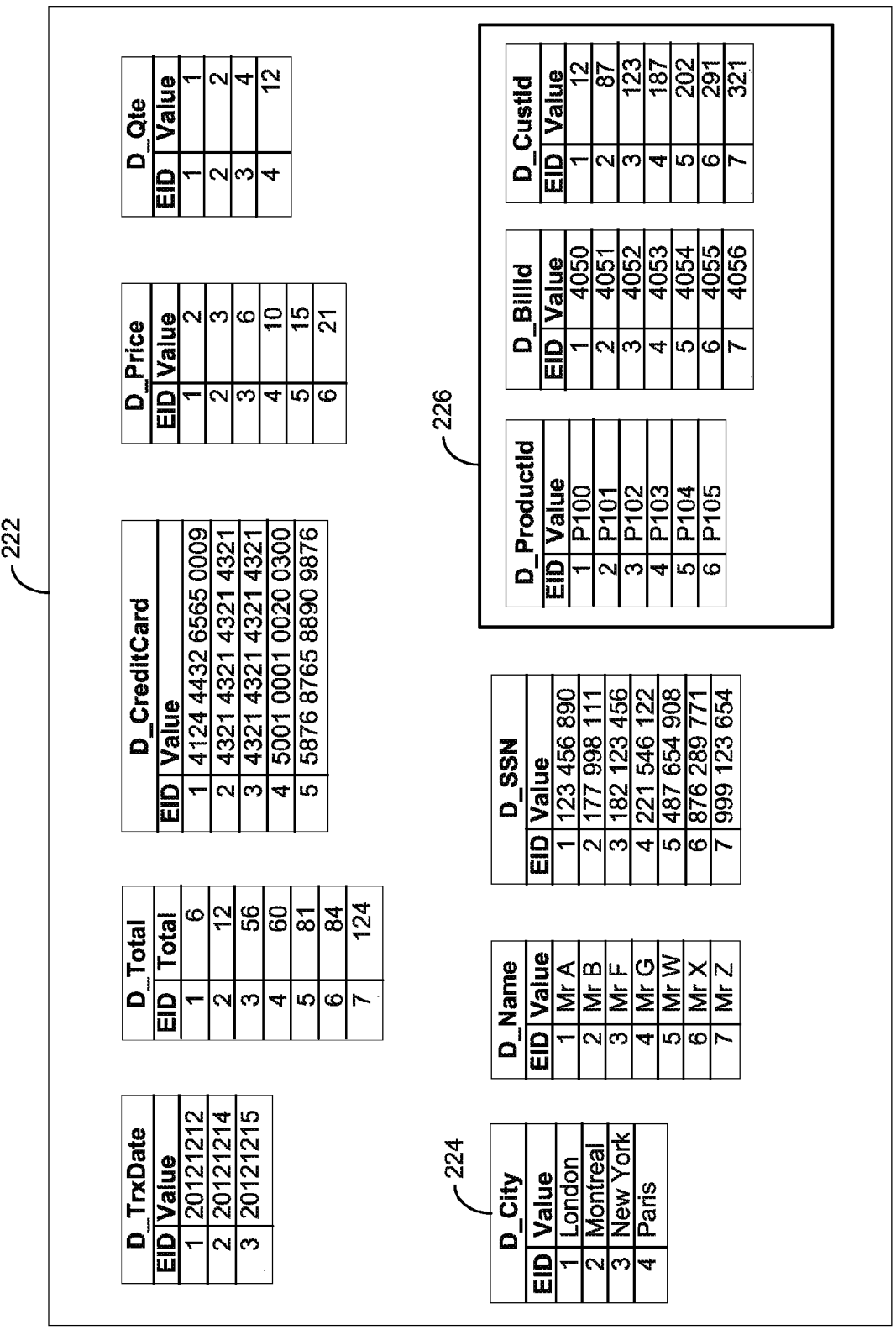
FIG. 2B illustrates domain data structures stored in the domain metadata and associated with the tables illustrated in FIG. 2A according to one embodiment.

FIG. 2A illustrates exemplary tables in the database 102 according to one embodiment. As shown, the database 102 includes the customer table 202, the bill table 204, the line item table 206, and the product table 208. The customer table includes a primary column, customer ID 210, that is linked to the secondary column, customer ID 212, in the bill table 204. The bill table 204 includes a primary column, bill ID 214, that is linked to the secondary column, bill ID 216, in the line item table 206. The product table 208 includes a primary column, product ID 220, that is linked to the secondary column, product ID 218, in line item table 206. Each cell in the different tables includes an entity identifier associated with a value stored in a domain data structure. The domain data structure associated with each table is shown in FIG. 2B and described below.

FIG. 2B illustrates domain data structures 222 stored in the domain metadata 104 and associated with the tables illustrated in FIG. 2A according to one embodiment. As shown, the domain data structures 222 include a different domain data structure associated with each unique column in the tables illustrated in FIG. 2A. The driving domain data structures 226 are each associated with a primary column illustrated in FIG. 2A.

Each domain data structure stored in the domain metadata 104 includes a column of unique values and a column of entity identifiers associated with the unique values. For example, the city domain data structure 224 is associated with the "City" column in the customer table 202 of FIG. 2A. The city domain data structure 224 includes a column of unique city values, e.g., "London," and a column of associated entity identifiers, e.g., "1" associated with "London." The entity identifiers included in the "City" column in the customer table 202 of FIG. 2A correspond to the city values stored in the city domain data structure 224.

Data in the database 102 may be used for testing various functions exposed by applications that rely on the data. The test data server 106 extracts such test data from the database 102 based on selection parameters provided by test development engineers or generated automatically based on the application(s) being tested. Although only one test data server 106 is illustrated, the computing environment 100 may include multiple instances of the server.

Extracting Test Data from Database

In operation, the test data server 106 receives a test data query that specifies selection parameters for selecting test data from the database 102, and any transformation operations to be performed on the test data according to one embodiment. The selection parameters specify different parameters for selecting test data, where each parameter is associated with a domain represented by a domain data structure stored in the domain metadata 104. For example, the test data selection parameters may include the zip code parameter "9*," specifying any zip code having 9 as the leading digit. The zip code parameter is associated with the "Zip Code" domain, for example as represented by the "Zip Code" domain data structure of Table 1 above. The test data selection parameters may also specify how different parameters associated with the same domain are to be combined through Boolean operations, such as conjunction, disjunction and negation.

The test data server 106 identifies the domains associated with the selection parameters and traverses the tables in the database 102 based on the identified domains to extract test data that satisfies the selection parameters. The test data server 106 optionally performs transformation operations, such as selects, joins, masks and filters, specified by the test data query on the extracted data. In addition, the test data server 106 stores the identified domains so that the extraction of test data that satisfies the selection parameters can be performed repetitively without reevaluating the test data query each time. The following discussion describes the operations of the test data server 106 in detail.

The test data server 106 includes a definition generation module 108, a test data extraction module 116, and a test data manipulation module 122, according to one embodiment. As will become apparent, the various data processing operations performed by the test data server 106 and its modules are sufficiently complex and time consuming as to require the operation of a computer system, and cannot be performed in the human mind by mental steps alone.

The definition generation module 108 is configured to receive as input a test data query that specifies, among other information, a set of test data selection parameters, and generate a test data definition that identifies values in the domains associated with the selection parameters that satisfy the selection parameters, and is one means for performing this function. The definition generation module 108 includes a domain identifier 110 and an entity selector 112 that operate in conjunction to generate the test data definition corresponding to the test data selection parameters. The definition generation module 108 stores test data definitions in the test data inventory 114.

The test data extraction module 116 is configured to execute test data definitions stored in the test data inventory 114 and extract test data from the database 102 based on the definitions, and is one means for performing this function. A test data definition stored in the test data inventory 114 may be individually executed by the test data extraction module 116. In addition, the test data manipulation module 122 is configured to combine multiple test data definitions stored in the test data inventory 114 by applying combination functions, such as union and intersection, on the definitions, and is one means for performing this function. The combined test data definition may be executed by the test data extraction module 116 to extract test data associated with multiple selections parameters from the database 102.

Figure 3:
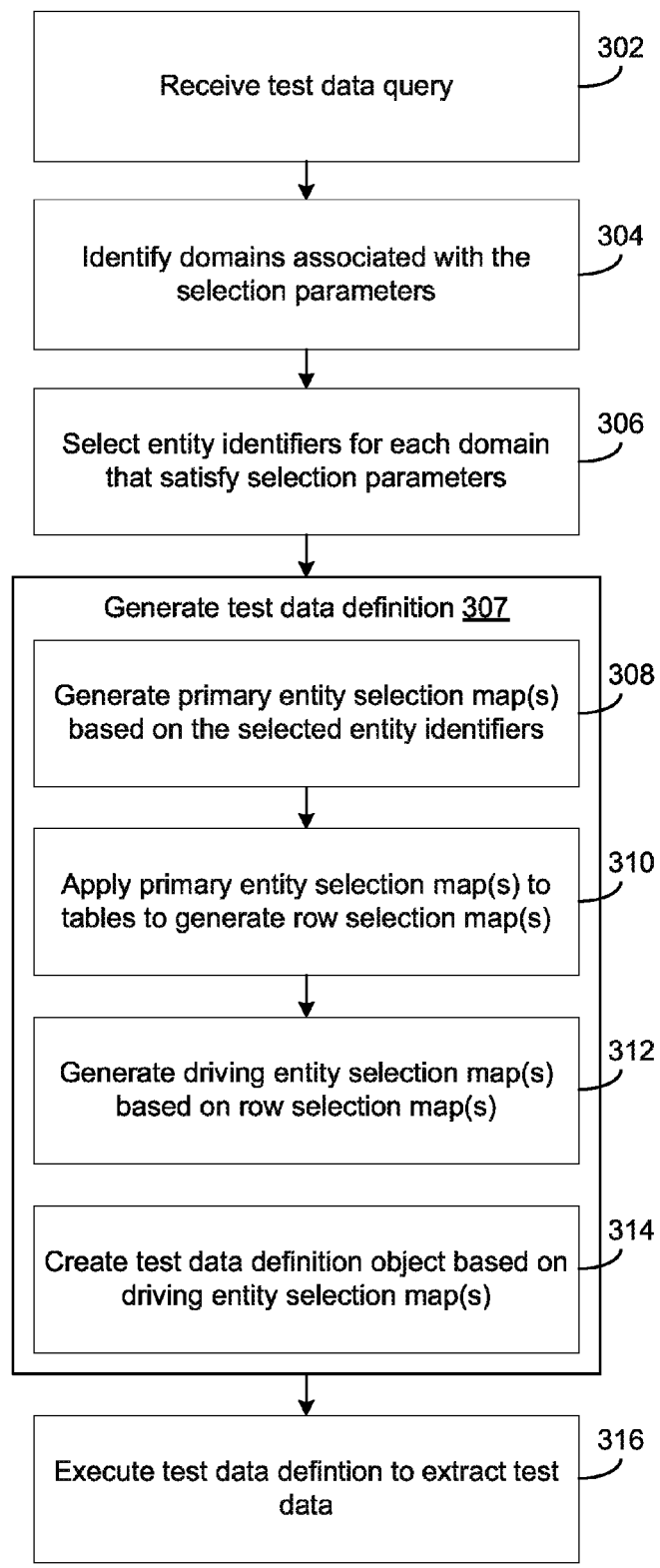
FIG. 3 is a flow diagram illustrating steps of a method for generating test data according to one embodiment.

FIG. 3 is a flow diagram illustrating steps of a method for generating test data according to one embodiment. The steps may be performed, for example, by the various modules within the test data server 106. In some implementations, the steps are performed in an order other than the order presented in FIG. 3, and in other implementations, additional or alternative steps may be performed.

Figure 4A:
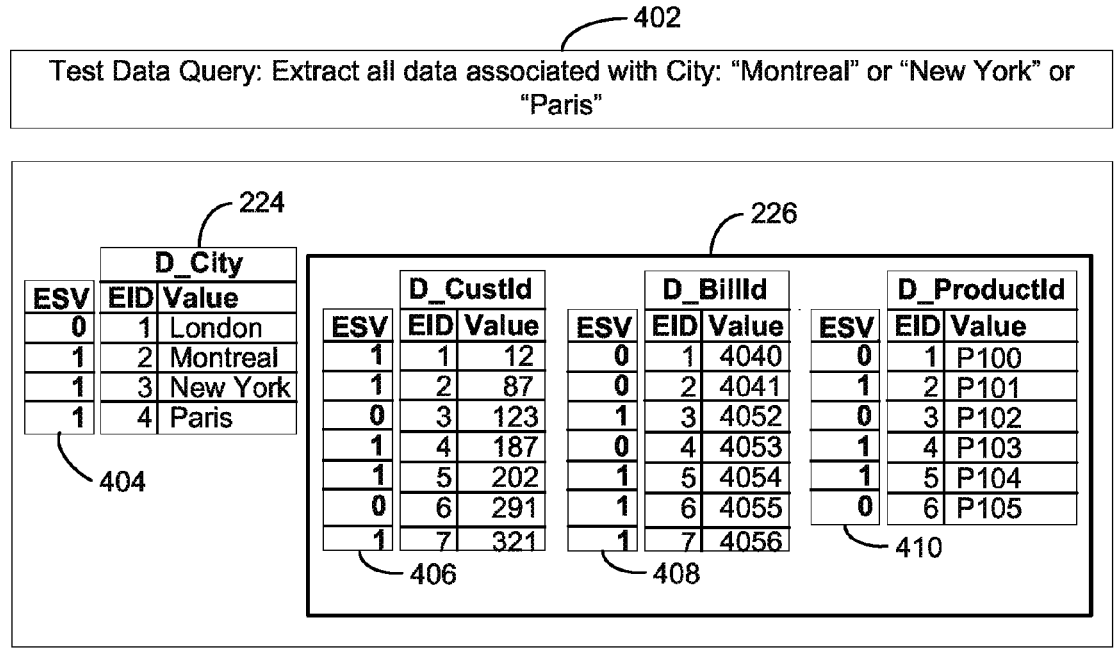
FIG. 4A illustrates an exemplary test data query received by the definition generation module according to one embodiment.
Figure 4A:
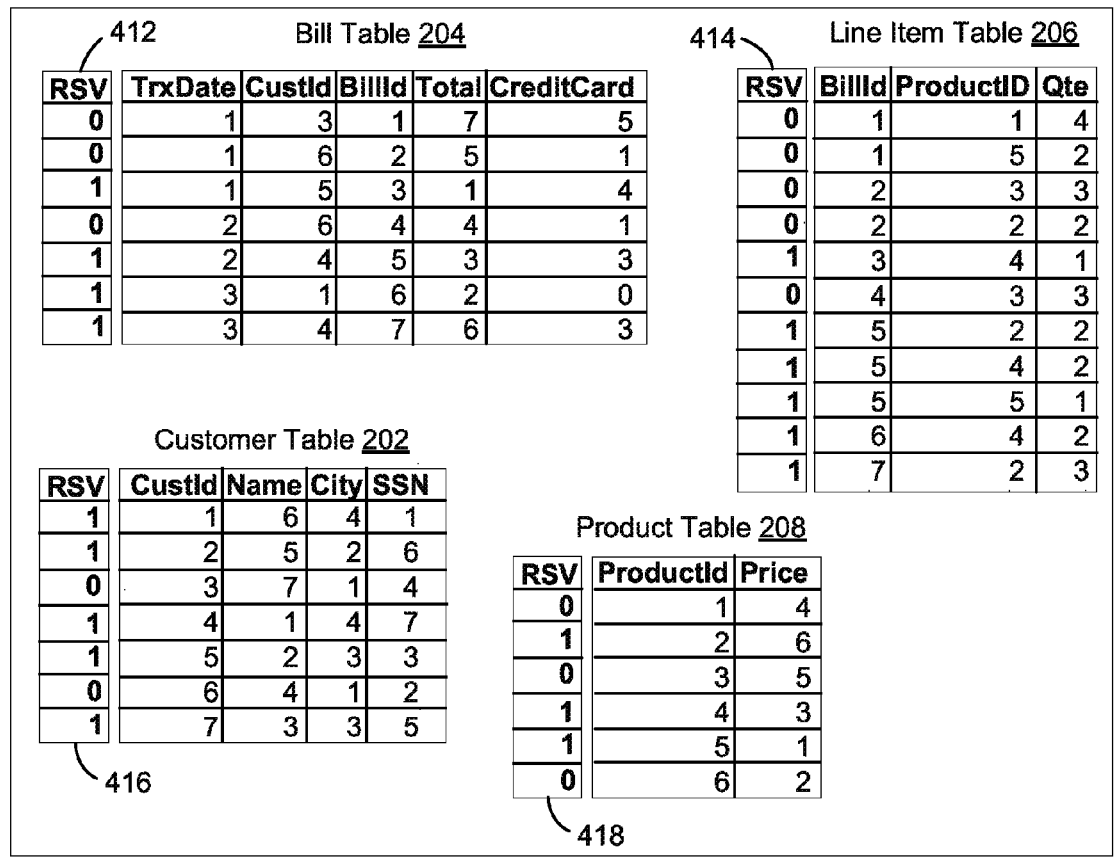

The method begins by the definition generation module 108 in the test data server 106 receiving 302 a test data query that specifies selection parameters for selecting test data from the database 102 and any transformation operations to be performed on the test data. FIG. 4A illustrates an exemplary test data query 402 received by the definition generation module 108 according to one embodiment. The test data query 402 specifies selection parameters related to the "City" column in the customer table 202 of FIG. 2A. Specifically, the test data query specifies that any data associated with the city "Montreal," "New York," or "Paris" should be extracted.

Referring back to FIG. 3, in the next step, the domain identifier 110 in the definition generation module 108 identifies 304 all the domains associated with the selection parameters. With respect to test data query 402 of FIG. 4A, the domain identifier 110 identifies the city domain data structure 224 as being associated with the selection parameters. In one embodiment, the test data server 106 identifies the domains by parsing the test data query 402 and matching parsed keywords from the query against domain names stored in the domain metadata 104. In one embodiment, the test data selection parameters are provided in a particular query format, and the domain identifier 110 is configured with a parsing mechanism specific to the query format.

Referring back to FIG. 3, the entity selector 112 next selects 306 entity identifiers in each of the domains that satisfy the test data selection parameters. More specifically, for a domain, the entity selector evaluates each value included in the associated domain data structure to determine whether the value satisfies the selection parameter(s) associated with the domain. If the value satisfies the selection parameter(s), then the entity identifier corresponding to the parameter is selected. With respect to test data query 402 of FIG. 4A, the entity identifiers 2, 3, and 4 in the domain data structure 224 are selected as the corresponding values satisfy the selection parameters "Montreal," "New York," and "Paris."

Referring back to FIG. 3, the entity selector 112 generates 307 a test data definition associated with the test data query based on the selected entity identifiers. Specifically, to generate the test data definition, the entity selector 112 first generates 308 primary entity selection map(s) based on the selected entity identifiers. Each primary entity selection map corresponds to a domain and identifies all the values in the domain that satisfy the selection parameter(s). The primary entity selection map may be any associative data structure including but not limited to a bitmap, hash table, trie, etc. In one embodiment, the primary entity selection map is a bitmap that stores a bit sequence corresponding to the set of entity identifiers in the domain. If an entity identifier in the domain is selected, then the bit corresponding to the entity identifier is set to "1." Conversely, if the entity identifier is not selected, then the bit corresponding to the entity identifier is set to "0." With respect to test data query 402 of FIG. 4A, the entity selector 112 generates the primary entity selection map 404 that identifies entity identifiers in the city domain data structure 224 that satisfy the selection parameters specified by the test data query 402. As shown in example of the figure, the map 404 comprises a bit map [0,1,1,1].

Next, the entity selector 112 applies 310 each primary entity selection map corresponding to a domain to the table in the database 102 that includes a column associated with the domain. The application of each primary entity selection map results in a row selection map that identifies each row in the table that includes an entity identifier that satisfies the selection parameter(s). The row selection map may be any associative data structure including but not limited to a bitmap, hash table, trie, etc. In one embodiment, the row selection map is a bitmap that stores a bit corresponding to each row in the table. If a row includes an entity identifier that satisfies the selection parameter(s), then the bit corresponding to the row is set to "1." Conversely, if the row does not include an entity identifier that satisfies the selection parameter(s), then the bit corresponding to the row is set to "0." With respect to test data query 402 of FIG. 4A, the entity selector 112 applies the primary entity selection map 404 to the customer table 202 to generate the row selection map 416. The row selection map 416 identifies each row in the customer table 202 that includes an entity identifier that satisfies the selection parameters "Montreal," "New York," and "Paris."

Referring back to FIG. 3, the entity selector 112 next generates 312 driving entity selection maps based on the rows identified by the row selection maps. Specifically, for each row selection map, the entity selector 112 identifies a primary column in the table, i.e., a column associated with a driving domain, and generates a driving entity selection map based on the rows identified in the row selection map. The driving entity selection map identifies each entity identifier in the driving domain that is associated with a value included in at least one of the identified rows. The driving entity selection map may be any associative data structure including but not limited to a bitmap, hash table, trie, etc.

The entity selector 112 also analyzes the table to determine whether the table includes a secondary column associated with a different driving domain. If the table includes such a column, then the entity selector 112 generates another driving entity selection map that identifies all the values in the different driving domain that are included in the rows identified by the row selection map. The entity selector 112 performs the process of identifying driving domains and traversing the different tables in the database 102 to generate driving entity selection maps and row selection maps until all relevant tables are traversed.

In cases where the test data selection parameters are associated with two or more domains, the application of the primary entity selection maps may result in two or more driving entity selection maps associated with the same driving domain. In such cases, the driving entity selection maps are combined based on the combination operator provided by the test data selection parameters. For example, the test data selection parameters may include the city selection parameter "San Francisco" and the zip code selection parameter "9*." In this case, the test data query also specifies that the selection parameters are to be combined via an "AND" combination operator. The combination operator is applied to the two or more driving entity selection maps to generate a single driving entity selection map associated with the driving domain.

With respect to test data query 402 of FIG. 4A, the entity selector 112 identifies the "CustID" column in the customer table 202 as a primary column in the table associated with the row selection map 416. The entity selector 112 then generates the driving entity selection map 406 associated with the "CustID" driving domain. The driving entity selection map 406 identifies each entity identifier in the "CustID" driving domain that is associated with a value included in at least one of the rows identified by the row selection map 416. The entity selector 112 performs the process of identifying driving domains and traversing the different tables in the database 102 to generate the additional driving entity selection maps 408 and 410. The driving entity selection maps 406, 408, and 410 identify entity identifiers in the various driving domain data structures 226 that satisfy the selection parameters.

The entity selector 112 creates 314 a test data definition object for storage in the test data inventory 114. The test data definition object includes the driving entity selection maps generated by the entity selector 112, the test data selection parameters and any transformation operations specified by the test data query received by the definition generation module 108. The test data definition object optionally includes any additional information provided the test data query, such as the name of the query creator, a name for the query, and a name of the application for which the test data is being generated.

To extract test data from the database 102, the test data extraction module 116 executes 314 the test data definition by applying each driving entity selection map(s) corresponding to a driving domain to a table that includes the primary column associated with the driving domain. The row selection maps resulting from the application identify all the rows in the different tables that include data satisfying the test data selection parameters.

More specifically, a transformation operator 118 and a data extractor 120 included in the test data extraction module 116 operate in conjunction to extract test data based on the test data definition. The transformation operator 118 identifies transformation operations included in the test data definition object and performs those operations on the values in the relevant the domain data structures. A transformation operation specifies a particular domain and, when executed on the values of the domain, transforms the values according to a particular function. The transformation may be necessary to mask sensitive information, such as customers' personal or billing information, or to age data, such as aging transaction dates by a specific time period, to expand the testing scope.

To perform the transformation operation specified by a test data definition object, the transformation operator 118 analyzes the transformation operation in one embodiment to determine the domain associated with the operation. The transformation operator 118 retrieves the domain data structure associated with the domain from the domain metadata 104 and applies the transformation operation on the domain data structure to generate a transformed domain data structure. In one embodiment, the transformation operation is a masking operation, where the masking function used in the masking operation is associated with the domain and retrieved from the domain metadata 104. The application of the transformation operation involves application of the transformation to each value included in the domain data structure to generate a transformed value. The transformation operator 118 stores the transformed domain data structure in the domain metadata 104 and associates the transformed domain data structure with the test data definition object.

The data extractor 120 extracts test data from the database 102 based on the driving entity selection maps stored in a test data definition object according to one embodiment. Specifically, the data extractor 120 applies each driving entity selection map to the table that includes the primary column associated with the driving domain corresponding to the selection map. The application of the driving entity selection maps results in a set of row selection maps. Each row selection map is associated with a different table and identifies a set of rows in the table that each satisfies the test data selection parameters included in the test data definition object.

For each row selection map, the data extractor 120 extracts all the rows identified by the map into a test data table. The data extractor 120 then replaces the entity identifiers stored in the different rows in the test data tables with the associated values stored in the domain data structure. Alternatively, if the domain data structure has been transformed by the transformation operator 118, then the data extractor 120 replaces the entity identifiers in the test data tables with the values stored in the transformed domain data structure. The test data tables may be presented to a tester for testing an application or may be stored in the test data inventory 114 in association with the test data definition object.

With respect to test data query 402 of FIG. 4A, the test data extraction module 116 applies each driving entity selection map 406, 408, and 410 to the table that includes the primary column associated with the driving domain corresponding to the selection map. The application of the driving entity selection maps results in a set of row selection maps 412-418. Each row selection map identifies a set of rows in the associated table that each satisfies the test data selection parameters. The test data extraction module 116 applies the set of row selection maps 412-418 to the associated tables in the database 102 to extract the test data 420 illustrated in FIG. 4B.

FIG. 5A illustrates an exemplary test data query 502 and the resulting entity selection maps according to one embodiment. The test data query 502 specifies selection parameters related to the "City" column in the customer table 202 and the "Total" column in the bill table 204. The test data query 502 also specifies that, when test data is extracted, sensitive data should be masked and the data should be aged by a year.

The definition generation module 108 operates on the selection parameters of the test data query 502 to generate the primary entity selection maps 504 and 506 and the driving entity selection maps 508, 510, and 512. The primary entity selection maps 504 and 506 identify entity identifiers in the city domain data structure 224 and the total domain data structure that satisfy the selection parameters specified by the test data query 502. Similarly, the driving entity selection maps 508, 510, and 512 identify entity identifiers in the various driving domain data structures 226 that satisfy the selection parameters. The driving entity selection maps 508, 510, and 512 are included in the test data definition associated with the test data query 502 and stored in the test data inventory 114.

The test data extraction module 116 applies each driving entity selection map 508, 510, and 512 to the table that includes the primary column associated with the driving domain corresponding to the selection map. The application of the driving entity selection maps results in a set of row selection maps 514. Each row selection map 514 identifies a set of rows in the associated table that each satisfies the test data selection parameters.

In addition, the test data extraction module 116 performs the masking and data aging transformations specified by the test data query 502. Specifically, the test data extraction module 116 applies a masking transformation operation to the domain data structures associated with sensitive data to generate the masked domain data structures 516. In addition, the test data extraction module 116 applies an aging transformation operation on the transaction date domain data structure to generate the aged transaction date data structure 518.

FIG. 5B illustrates the test data 520 extracted from the database 102 based on the test data query 502 of FIG. 5A according to one embodiment. The test data extraction module 116 applies each driving entity selection map 508, 510, and 512 to the table that includes the primary column associated with the driving domain corresponding to the selection map. The application of the driving entity selection maps results in a set of row selection maps 514. Each row selection map 514 identifies a set of rows in the associated table that each satisfies the test data selection parameters. When replacing entity identifiers included in the rows with associated values, the test data extraction module 116 uses the values in the masked domain data structures 516 and the aged transaction date data structure 518 instead of the untransformed domain data structures stored in the domain metadata 104.

Combining Test Data Definitions

The test data manipulation module 122 is configured to enable test development engineers to browse the test data definition objects stored in the test data inventory 114 and select definitions for generating test data, and is one means for performing this function. The test data manipulation module 122 includes an inventory browser 124 and an entity map operator 126. The inventory browser 124 provides a user interface that allows testers and other types of users to browse test data definition objects that were previously created. The user interface displays the test data selection parameters, the entity maps and any other information included in a given test data definition object. For a given test data definition object, the user interface provided by the inventory browser 124 may also display an execution log indicating when the test data definition object was used to extract test data and may optionally display the extracted test data.

The inventory browser 124 also enables testers to select test data definition objects for execution by the test data extraction module 116 to extract test data. When a tester selects two or more test data definition objects, the inventory browser enables the tester to provide an combination operator for combining the driving entity selection maps included in the test data definition objects. The combination operator may be one of a series of set functions including, but not limited to, a union operator, an intersection operator, a symmetric difference operator, an absolute complement operator, and a complement operator.

The entity map operator 126 receives the selection of the test data definition objects and the combination operator and combines the entity selection maps included in the test data definition objects based on the combination operator according to one embodiment. Specifically, the entity map operator 126 performs the set operation specified by the combination operator on each group of entity selection maps that are associated with the same driving domain. The resulting entity selection map identifies the entity identifiers that satisfy the test data selection parameters included in the test data definition objects and combined according to the combination operator. The entity map operator 126 may create a new test data definition object based on the resulting entity selection map and store the test data definition object in the test data inventory 114. The test data extraction module 116 may process the new test data definition object to extract test data in the same manner as discussed above.

Figure 6:
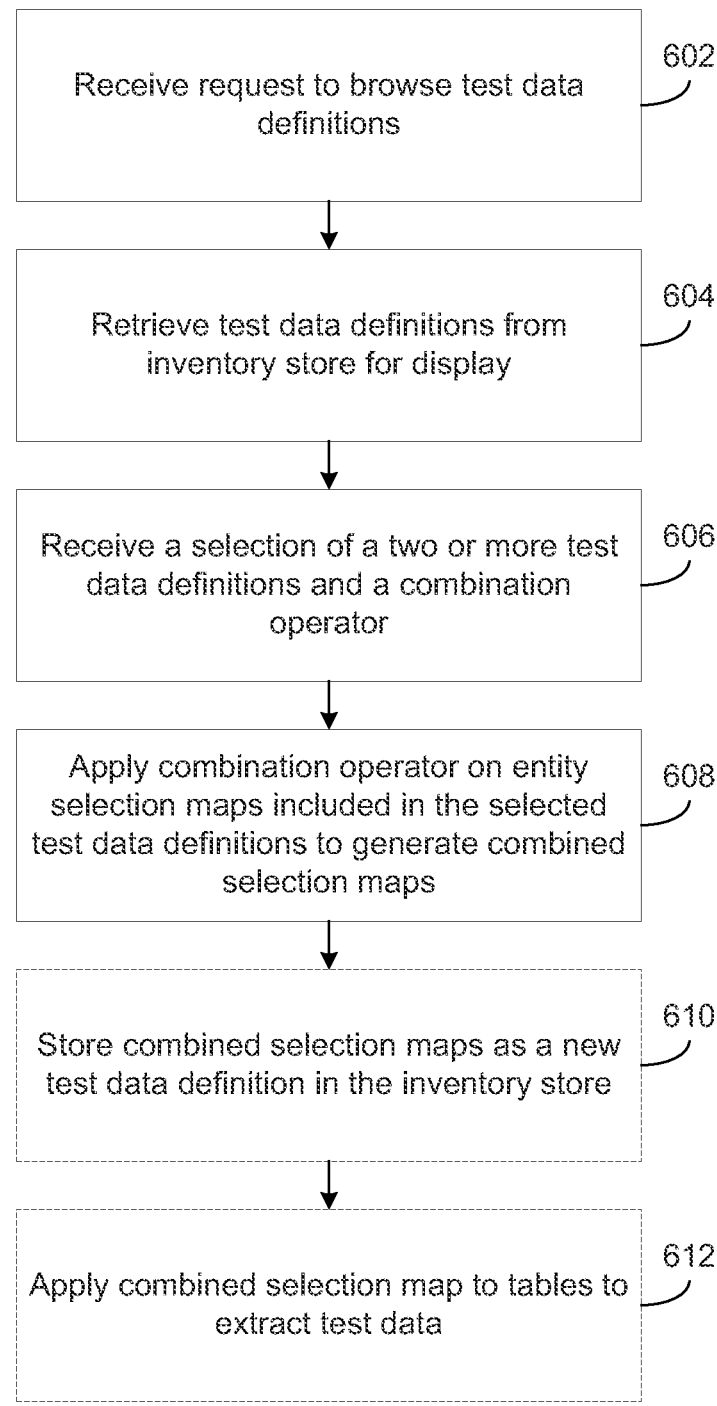
FIG. 6 is a flow diagram illustrating steps performed by the test data manipulation module for combining test data definitions according to one embodiment.

FIG. 6 is a flow diagram illustrating steps performed by the test data manipulation module 122 for combining test data definitions according to one embodiment. In some implementations, the steps are performed in an order other than the order presented in FIG. 6, and in other implementations, additional or alternative steps may be performed.

The method begins by the test data manipulation module 122 receiving 602 a request to browse test data definitions stored in the test data inventory 114. The test data server 106 retrieves 604 test data definitions from the test data inventory 114 for display. In one embodiment, the test data server 106 provides a user interface that displays the test data selection parameters, the entity maps, and any other information included in a each test data definition.

The test data manipulation module 122 receives 606 a selection of two or more test data definitions and an combination operator for combining the driving entity selection maps included in the test data definition objects. The combination operator may be one of a series of set functions including, but not limited to, a union operator, an intersection operator, a symmetric difference operator, an absolute complement operator, and a complement operator.

The test data manipulation module 122 applies 608 the combination operator to the driving entity selection maps included in the test data definition objects to generate combined selection maps. Specifically, the entity map operator 126 performs the set operation specified by the combination operator on each group of entity selection maps that are associated with the same driving domain. The resulting entity selection map identifies the entity identifiers that satisfy the test data selection parameters included in the test data definition objects and combined according to the combination operator.

The test data manipulation module 122 optionally stores 610 the combined selection maps as new test data definitions in the test data inventory 114. The test data extraction module 116 optionally applies 612 the combined selection maps to tables in the database 102 to extract test data.

Figure 7A:
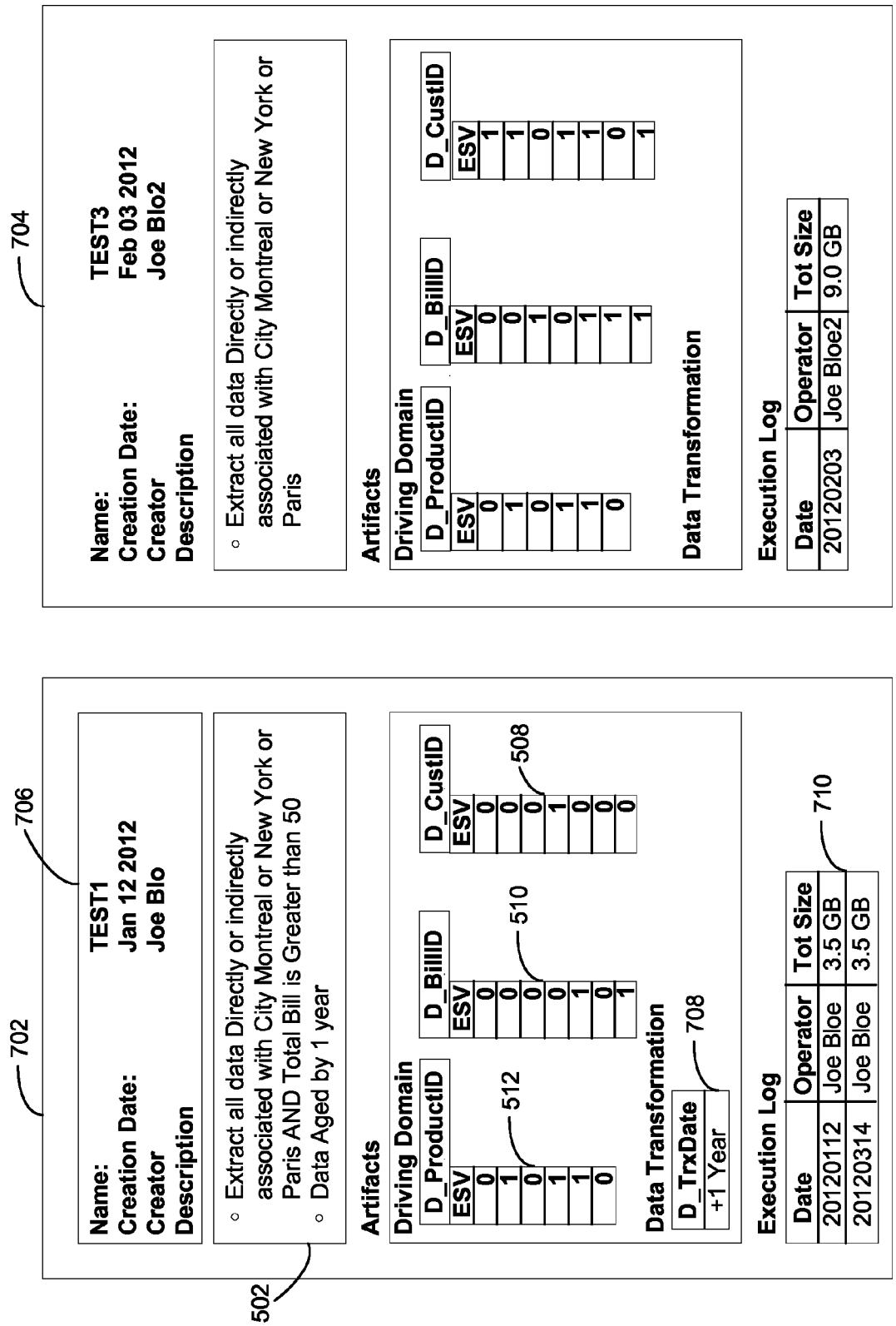
FIG. 7A illustrates an exemplary display of test data definition object and test data definition object according to one embodiment.

FIG. 7A illustrates an exemplary display of test data definition object 702 and test data definition object 704 according to one embodiment. The test data definition object 702 is associated with the test data query 502 of FIG. 5A, and the test data definition object 704 is associated with the test data query 402 of FIG. 4A. As shown, the test data definition object 702 includes descriptive information about the test data definition, such as the name and the creation date. The test data definition object 702 also includes the associated test data query 502, the driving entity selection maps 508, 510, and 512 and the aging transformation. The test data definition object 702 includes an execution log 710 that indicates when the test data definition object was executed to extract test data from the database 102.

Figure 7B:
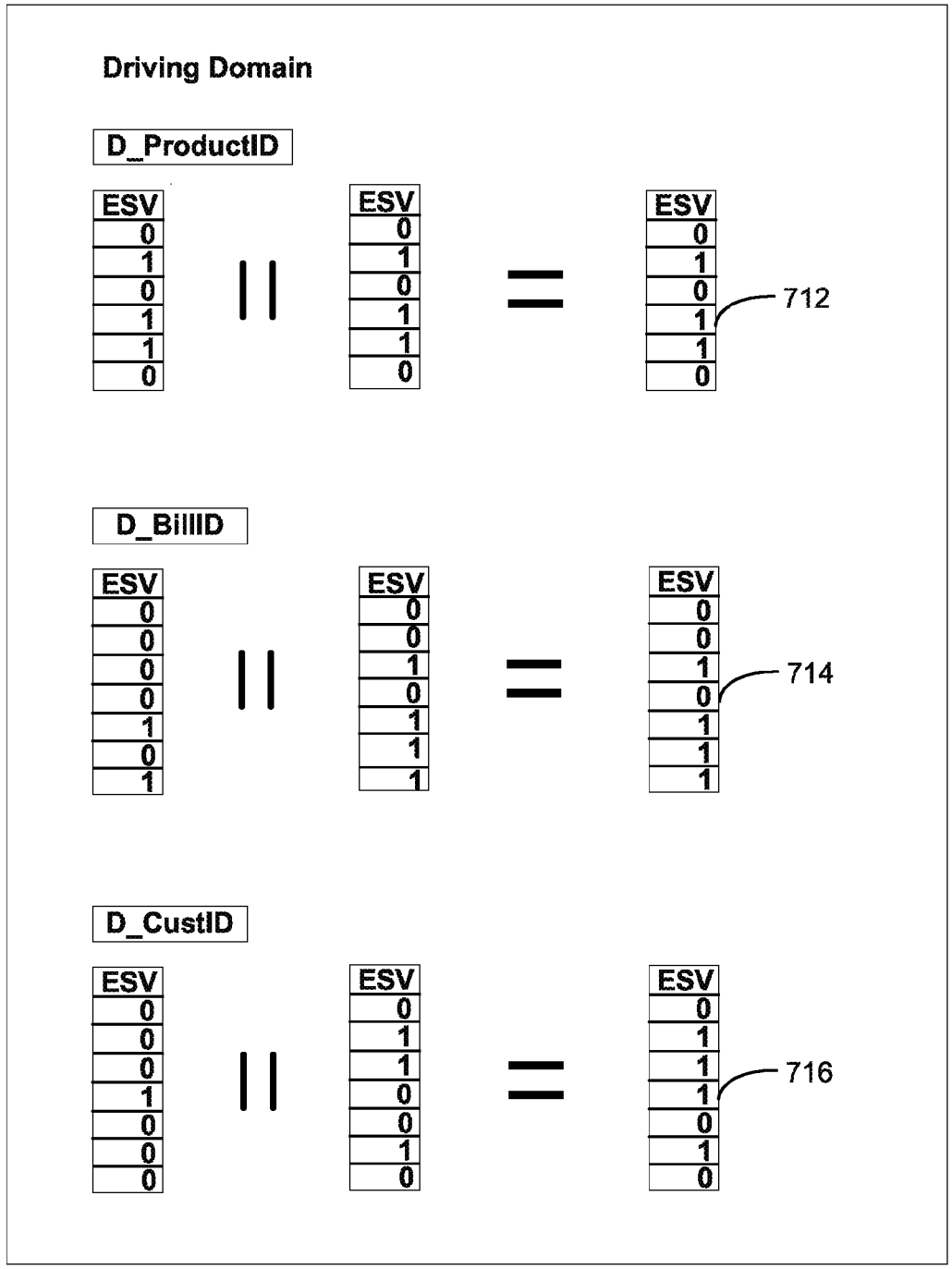
FIG. 7B illustrates an exemplary combination of the driving entity selection maps included in the test data definition object and the test data definition object according to one embodiment.

FIG. 7B illustrates an exemplary combination of the driving entity selection maps included in the test data definition object 702 and the test data definition object 704 according to one embodiment. In operation, a tester selects the test data definition object 702 and the test data definition object 704 for combination and a combination operation. In the illustrated embodiment, the selected combination operation is a union operation or a Boolean "OR" operation. The test data manipulation module 122 applies the combination operator to the driving entity selection maps included in the test data definition objects 702 and 704 to generate combined selection maps 712, 714, and 716. The test data extraction module 116 may apply the combined selection maps 712, 714, and 716 to tables in the database 102 to extract test data. Using combined selection maps when extracting test data allows test development engineers to fine tune the data used for testing. Further, test development engineers are able to understand and evaluate the difference between different test cases when the selection maps for those test cases are combined using certain operations.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, the term "module" refers to computer program logic utilized to provide the specified functionality. Thus, a module can be implemented in hardware, firmware, and/or software. In one embodiment, program modules are stored on a storage device, loaded into memory, and executed by a processor. Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating test data for testing an application from a database. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for generating test data for testing an application from a database having a table comprising at least one column, the method comprising:
   receiving a test data query that specifies at least one selection parameter;
   identifying a data domain associated with the at least one selection parameter, the data domain corresponding to a column in the table and including for each unique value in the column a corresponding unique entity identifier;
   selecting, within the identified data domain, one or more entity identifiers that correspond to one or more values satisfying the at least one selection parameter;
   automatically generating an entity selection map that specifies the one or more selected entity identifiers included in the data domain;
   automatically generating a test data definition associated with the test data query based on the entity selection map, the test data definition identifying test data in the database associated with the one or more selected entity identifiers; and
   automatically executing the test data definition to extract the test data.

2. The method of claim 1, wherein generating the test data definition comprises:
   generating a row selection map associated with the table based on the entity selection map, the row selection map identifying a set of rows in the table that each includes a value corresponding to at least one of the one or more selected entity identifiers;
   identifying a driving domain corresponding to a second column in the table, the driving domain including for each unique value in the second column a corresponding unique entity identifier;
   selecting one or more driving entity identifiers in the driving domain that correspond to values included in the second column of the set of rows; and
   generating a driving map that identifies the one or more driving entity identifiers.

3. The method of claim 2, wherein the test data definition includes the driving map, and executing the test data definition comprises applying the driving map to the table to extract at least a portion of the test data.

4. The method of claim 2, wherein generating the test data definition further comprises:
   determining that a second table in the database includes a third column that corresponds to the driving domain; and
   generating a second row selection map associated with the second table based on the driving map, the second row selection map identifying a second set of rows in the second table that each includes a value corresponding to at least one of the driving entity identifiers.

5. The method of claim 4, wherein executing the test data definition comprises applying the driving map to the second table to extract at least a portion of the test data.

6. The method of claim 1, further comprising storing the test data definition in a test data inventory that also stores a second test data definition associated with a second test data query.

7. The method of claim 6, further comprising:
   receiving a selection of the test data definition, the second test data definition, and a combination operator;
   combining the test data definition and the second test data definition based on the combination operator to generate a combined test data definition; and
   executing the combined test data definition to extract test data associated with the test data query and the second test data query from the database.

8. The method of claim 7, wherein the test definition includes a set of bitmaps for extracting the test data, the second test definition includes a second set of bitmaps for extracting second test data, the combination operation is a set function, and combining the test definition and the second test definition comprises performing the set function on the set of bitmaps and the second set of bitmaps.

9. The method of claim 1, wherein the table comprises a plurality of columns, each of the plurality of columns corresponding to a different data domain, and further comprising determining a domain category associated with each data domain corresponding to a column in the table, the domain category associated with a particular data domain indicating how data associated with the domain is to be processed during test data extraction.

10. The method of claim 1, wherein executing the test data definition to extract the test data comprises transforming the data domain such that each entity identifier in the data domain is associated with a transformed value, and wherein the extracted test data includes a first transformed value associated with a first entity identifier included in the one or more selected entity identifiers.

11. A computer program product having a non-transitory computer readable storage medium storing executable code for generating test data for testing an application from a database having a table comprising at least one column, the code when executed performs steps comprising:
   receiving a test data query that specifies at least one selection parameter;
   identifying a data domain associated with the at least one selection parameter, the data domain corresponding to a column in the table and including for each unique value in the column a corresponding unique entity identifier;
   selecting, within the identified data domain, one or more entity identifiers that correspond to one or more values satisfying the at least one selection parameter;
   automatically generating an entity selection map that identifies specifies the one or more selected entity identifiers included in the data domain;
   automatically generating a test data definition associated with the test data query based on the entity selection map, the test data definition identifying test data in the database associated with the one or more selected entity identifiers; and automatically executing the test data definition to extract the test data.

12. The computer program product of claim 11, wherein generating the test data definition comprises:

generating a row selection map associated with the table based on the entity selection map, the row selection map identifying a set of rows in the table that each includes a value corresponding to at least one of the one or more selected entity identifiers;

identifying a driving domain corresponding to a second column in the table, the driving domain including for each unique value in the second column a corresponding unique entity identifier;

selecting one or more driving entity identifiers in the driving domain that correspond to values included in the second column of the set of rows; and generating a driving map that identifies the one or more driving entity identifiers.

13. The computer program product of claim 12, wherein the test data definition includes the driving map, and executing the test data definition comprises applying the driving map to the table to extract at least a portion of the test data.

14. The computer program product of claim 12, wherein generating the test data definition further comprises:

determining that a second table in the database includes a third column that corresponds to the driving domain; and generating a second row selection map associated with the second table based on the driving map, the second row selection map identifying a second set of rows in the second table that each includes a value corresponding to at least one of the driving entity identifiers.

15. The computer program product of claim 14, wherein executing the test data definition comprises applying the driving map to the second table to extract at least a portion of the test data.

16. The computer program product of claim 11, wherein the code when executed further performs steps comprising storing the test data definition in a test data inventory that also stores a second test data definition associated with a second test data query.

17. The computer program product of claim 16, wherein the code when executed further performs steps comprising:

receiving a selection of the test data definition, the second test data definition, and a combination operator;

combining the test data definition and the second test data definition based on the combination operator to generate a combined test data definition; and executing the combined test data definition to extract test data associated with the test data query and the second test data query from the database.

18. The computer program product of claim 17, wherein the test definition includes a set of bitmaps for extracting the test data, the second test definition includes a second set of bitmaps for extracting second test data, the combination operation is a set function, and combining the test definition and the second test definition comprises performing the set function on the set of bitmaps and the second set of bitmaps.

19. The computer program product of claim 11, wherein the table comprises a plurality of columns, each of the plurality of columns corresponding to a different data domain, and further comprising determining a domain category associated with each data domain corresponding to a column in the table, the domain category associated with a particular data domain indicating how data associated with the domain is to be processed during test data extraction.

20. The computer program product of claim 11, wherein executing the test data definition to extract the test data comprises transforming the data domain such that each entity identifier in the data domain is associated with a transformed value, and wherein the extracted test data includes a first transformed value associated with a first entity identifier included in the one or more selected entity identifiers.

* * * * *